United States Patent [19]
Aldridge et al.

[11] Patent Number: 5,925,241
[45] Date of Patent: Jul. 20, 1999

[54] FLOOR DRAIN ODOR CONTROL DEVICE

[75] Inventors: William J. Aldridge, Carnegie; Darcy A. Kadilak, Coraopolis; James P. Markowitz, Bridgeville, all of Pa.

[73] Assignee: Calgon Carbon Corporation, Pittsburgh, Pa.

[21] Appl. No.: 09/009,404

[22] Filed: Jan. 20, 1998

Related U.S. Application Data

[63] Continuation-in-part of application No. 08/736,807, Oct. 25, 1996, abandoned.

[51] Int. Cl.$^6$ .............................. B01D 15/00; B01D 53/04
[52] U.S. Cl. ................................. 210/163; 55/515; 96/147
[58] Field of Search ................................ 95/90, 116, 114; 96/108, 147; 55/385.1, 512, 513, 515, 516, 518, 519; 210/163, 164, 263, 473, 502.1, 660

[56] References Cited

U.S. PATENT DOCUMENTS

| | | | |
|---|---|---|---|
| 154,645 | 9/1874 | Chase | 96/108 |
| 1,127,246 | 2/1915 | Hirshstein | 210/263 |
| 3,377,784 | 4/1968 | Walker | 55/385.1 |
| 3,385,196 | 5/1968 | Messen-Jaschin | 55/385.1 |
| 3,475,885 | 11/1969 | Kline | 96/147 |
| 4,350,502 | 9/1982 | Spatola | 55/74 |
| 4,586,941 | 5/1986 | Cooley | 55/385.1 |
| 5,223,154 | 6/1993 | MacPherson, Jr. et al. | 210/163 |
| 5,356,849 | 10/1994 | Matviya et al. | 502/180 |
| 5,444,031 | 8/1995 | Hayden | 502/180 |
| 5,725,782 | 3/1998 | Chinn et al. | 210/164 |

FOREIGN PATENT DOCUMENTS

| | | | |
|---|---|---|---|
| 2613399 | 10/1988 | France | 96/147 |
| 2269117 | 2/1994 | United Kingdom | 96/147 |

*Primary Examiner*—Duane S. Smith
*Attorney, Agent, or Firm*—Titus & McConomy

[57] ABSTRACT

A removable floor drain odor control device which fits into standard floor drains of various sizes and acts to reduce or eliminate odors emitted from floor drains through use of a washable and regenerable carbon-based adsorbent. The preferred carbon-based adsorbents is a catalytically-active carbonaceous char, with the Centaur™ carbon being most preferred.

9 Claims, 2 Drawing Sheets

FLOOR DRAIN ODOR CONTROL DEVICE

CROSS-REFERENCE

This is Continuation-in-Part Application of U.S. patent application Ser. No. 08/736,807 filed on Oct. 25, 1996, now abandoned, which is entitled Floor Drain Odor Control Device.

FIELD OF THE INVENTION

The present invention relates to a floor drain odor control device which fits into the upper surface region of a floor drain and which employs a washable carbon-based adsorbent which regenerates, or has its adsorbent capacity restored, through exposure to and washing by water or aqueous solutions.

BACKGROUND OF THE INVENTION

The present invention describes an apparatus which inserts into floor drains of various sizes and, through use of washable and regenerable carbon-based adsorbents, acts to reduce or eliminate odors and malodorous gases which originate from floor drains.

Current means for addressing such odors consist of pouring household cleaners, baking soda, water and/or bleach into the drain, all of which are short-term in nature. The odor control device of the present invention provides a long-term odor control which is superior to the existing remedies.

As described in this application, washable and regenerable carbon-based adsorbents are useful in reducing and eliminating malodorous gaseous compounds, including hydrogen sulfide, which are associated with floor drains. Catalytically-charged carbonaceous chars, which also reduce odors through catalytic reaction and whose adsorbent capacity is regenerated or restored through washing by water or similar liquid, are preferred. Of particular preference is the Centaur™ carbon described in U.S. Pat. Nos. 5,356,849 and 5,444,031.

The replaceable device of the current invention is not disclosed or suggested by prior art. While U.S. Pat. No. 4,586,941 discloses an apparatus which is inserted into large manholes for reduction or elimination of sewer gases, the use of activated carbon only is taught, and the apparatus is designed to divert liquids away from the carbon. British patent No. 2,269,117 similarly describes an apparatus which contains carbon and rests on top of a drain cover or vent for purposes of odor suppression, but specifically restricts the carbon to one that "must be kept dry" (page 1, line 14 and page 2, line 18. While British patent No. 2,269,117 does allow for insertion of the apparatus within a drain, the housing of the apparatus is specifically restricted to one which is liquid impermeable so that water or other liquids cannot come in contact with the carbon.

SUMMARY OF THE INVENTION

The floor drain odor control device of the present invention removably inserts into standard floor drains of various sizes and contains a washable and regenerable carbon-based adsorbent, and preferably a catalytically-active carbonaceous char such as Centaurs, described in U.S. Pat. Nos. 5,356,849 and 5,444,031, which reduce odors associated with and originating from floor drains through adsorption and, preferably, through catalytic reaction as well. In addition, contrary to prior art, the carbon-based adsorbent in the device regenerates when washed or contacted with water or aqueous solutions, and, therefore, the device is designed to facilitate such washing of the adsorbent. In a preferred embodiment, the device includes a container for holding the adsorbent, which container is screened and/or has openings throughout to allow both water (and aqueous solutions) and gases to pass through the container and contact the adsorbent, and a flange which extends from the outer perimeter of the the container, rests on the top of the floor drain and fits underneath and is secured by the floor drain cover.

DETAILED DESCRIPTION OF THE PREFERRED EMBODIMENT

Existing methods for controlling malodorous gases from floor drains involve the use of home remedies such as water, household cleaners, bleach and/or baking soda. These methods provide short-term relief only and, at times, do not fully eliminate the gaseous odors.

The current invention describes an odor control device which fits into standard floor drains of various sizes and comprises (1) a washable and regenerable carbon-based adsorbent, and (2) a housing which holds and supports the adsorbent at the top of the floor drain and allows both liquids and gases passing through the drain to come in contact with the adsorbent.

Figure 1:
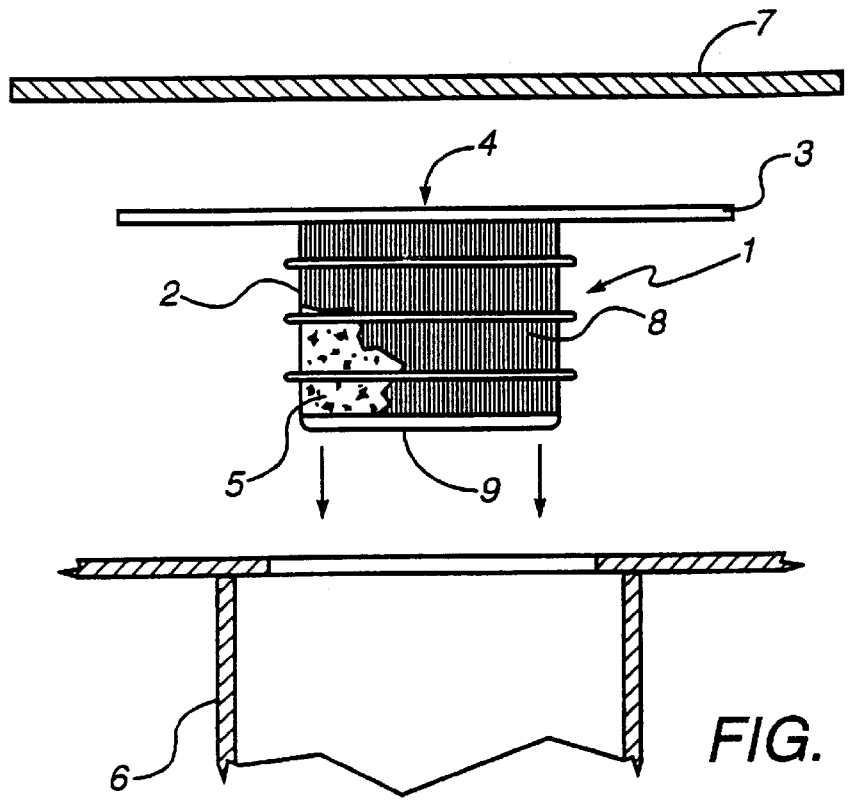
FIG. 1 is a cross-sectional view of a preferred embodiment of the floor drain odor control device.
Figure 2:
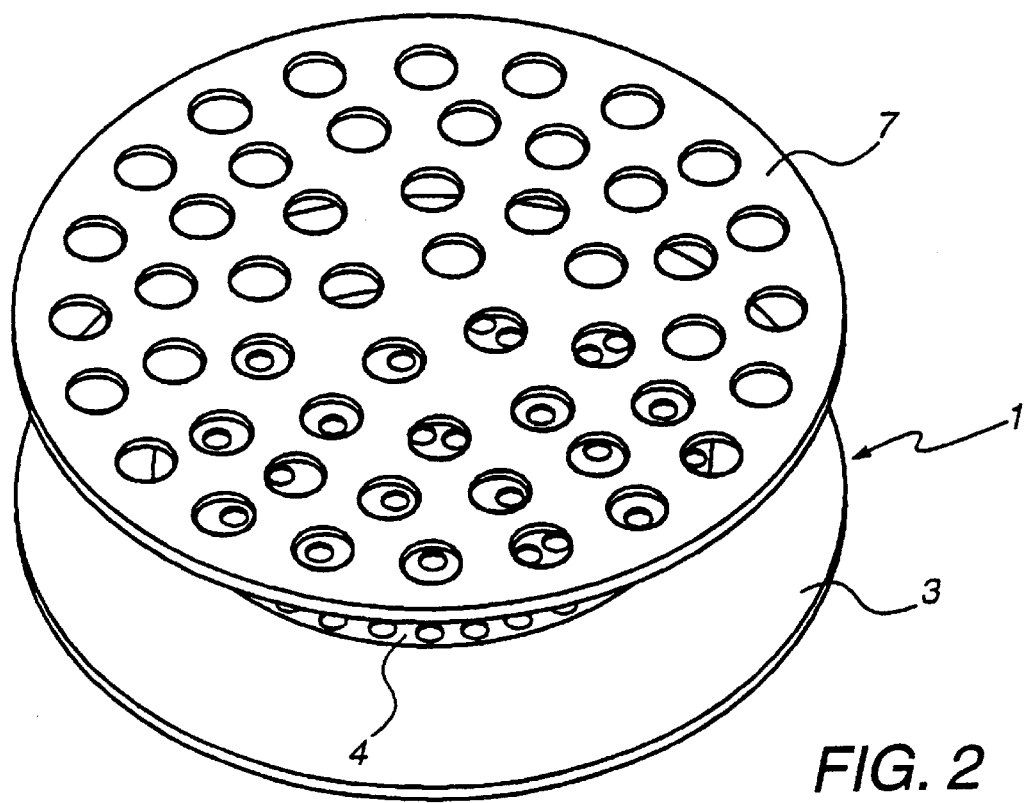
FIG. 2 is an isometric view of the floor drain odor control device depicted in FIG.

Referring to FIGS. 1 and 2, one embodiment of the present invention is depicted as floor drain odor control device 1. Device 1 has a housing which is comprised of container 2, flange 3 and screen 4. Container 2 has slits or openings through its side walls 8 and, preferably, lower surface 9, which allow gases and liquids to pass through the container. Adsorbent S is located within and is held by container 2.

In operation, container 2 fits within floor drain 6, with flange 3 extending from the outer perimeter of container 2 and resting on top of floor drain 6. Floor drain cover 7 rests on top of flange 3, holding device 1 in place, and sealing flange 3 and the top of the floor drain. Water or other liquids which are intended to flow into the floor drain pass through the floor drain cover 7, screen 4 and container 2. Gases emitted from the floor drain are directed upward through container 2 and adsorbent 5 contained therein, with the adsorbent 5 acting to eliminate floor drain odors.

The adsorbent 5 within container 2 is comprised of a washable and regenerable carbon-based adsorbent. A catalytically-active carbonaceous char, such as Centaur™, is preferred because, in addition to adsorbent properties, it also reduces odors through catalytic reaction with the malodorous gases and has its odor-reducing capacity regenerated through washing or contact with water or aqueous solutions passing through the drain. The preferred Centaur™ carbon is available from Calgon Carbon Corporation, Pittsburgh, Pa., and described specifically in U.S. Pat. Nos. 5,356,849 and 5,444,031, which are incorporated herein by reference as if fully set forth herein. The Centaur™ carbon is produced by (a) carbonizing a bituminous coal or a coal having bituminous properties at temperatures below 700° C., in the presence of an oxidant gas; (b) oxidizing said bituminous coal or coal having bituminous properties at temperatures below 700° C. during or after said carbonization; and (c) contacting said carbonized and oxidized coal or coal containing bituminous properties with a nitrogen-containing compound and during said contacting increasing the temperature to above 700° C.

Various forms of the adsorbent may be used in the odor control device, including granular, pellet, cloth, and bonded particles in differing shapes and sizes.

Container 2, flange 3 and screen 4 are preferably comprised of plastic. Other strong, lightweight materials may be utilized, however, and these component parts may be comprised of different materials.

Flange 3, in a preferred embodiment, has an adjustable diameter. In particular, device 1, when purchased, would have a flange 3 with a maximum diameter. The diameter can be decreased by trimming flange 3 with a scissors or other cutting edge. Alternatively, flange 3 can be comprised of concentric rings which can be detached from one another and, as a result, shorten the diameter of flange 3.

In an alternative embodiment, flange 3 is substantially eliminated and container 2, along with screen 4, are clipped or otherwise removably attached to and suspended from the underside of floor drain cover 7. In this embodiment, while flange 3 is not necessary to support device 1 in place at the top of the floor drain, a nonpermeable flange of sufficient diameter should be employed so as to cover, at the top of container 2, any openings between the external walls of container 2 and the internal walls of floor drain 6. Without such a covering, odors emitted from the floor drain may pass through these openings without exposure to the adsorbent.

Figure 3:
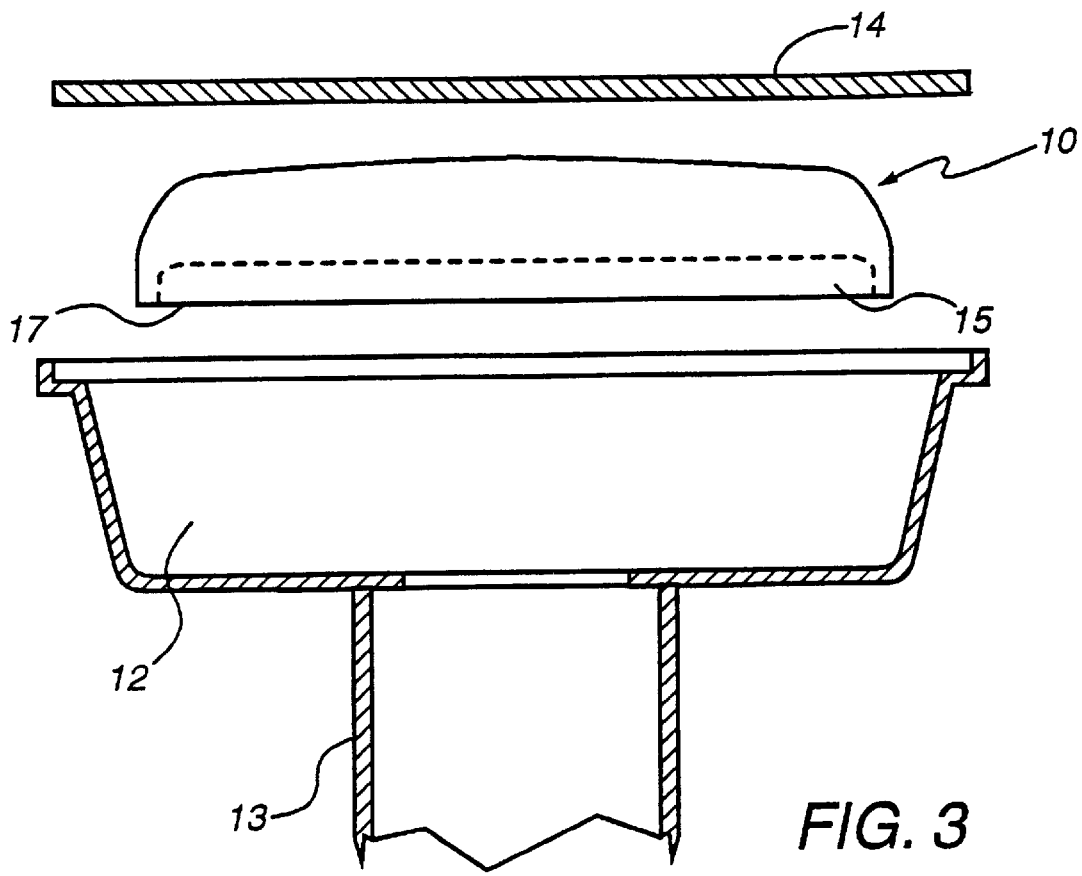
FIG. 3 is a cross-sectional view of another preferred embodiment of the floor drain odor control device.
Figure 4:
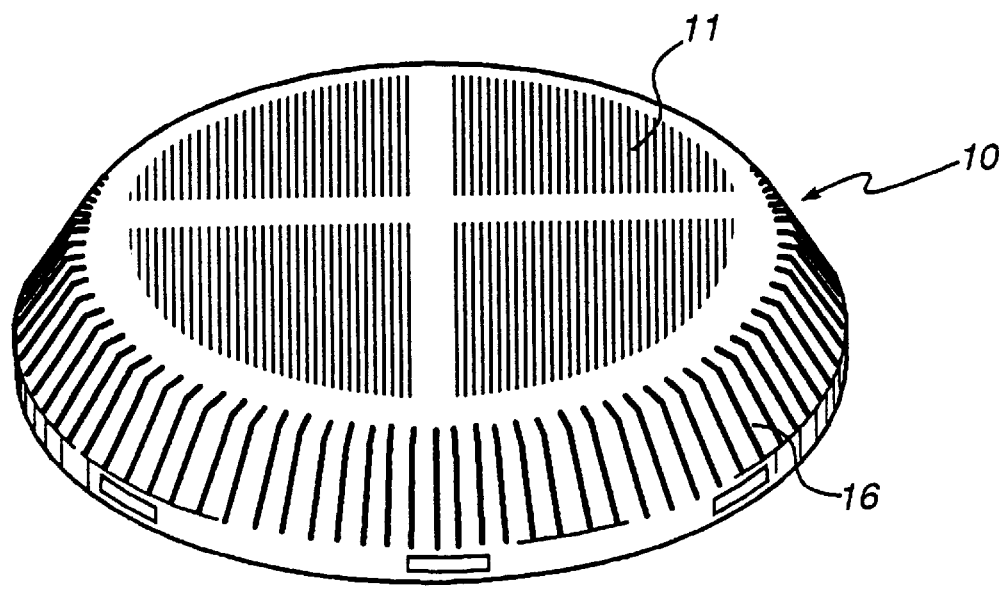
FIG. 4 is an isometric view of the floor drain odor control device depicted in FIG. 3.

A further embodiment is depicted in FIGS. 3 and 4. Device 10 is comprised of a saucer-shaped housing, with a screened upper surface 11 and side walls 16 having openings or slits therein, which contains an adsorbent 15. Lower surface 17 is screened or has openings within it, as well. Device 10 fits within the larger diameter upper region 12 of floor drain 13 and rests underneath floor drain cover 14. Housing 11 has openings or slits throughout its walls, which allow liquids and gases to pass through the absorbent within. The composition of housing 11 and of the absorbent are similar to that used in connection with the embodiment described above as device 1.

The useful life of the embodiments of this invention is contingent upon the amount of adsorbent in use and the strength of the odors emitting from the floor drain. Under normal conditions, the odor control device has a useful life of about 6 months.

Modifications of the preferred embodiments of the floor drain odor control device may be apparent to those skilled in the art.

What is claimed is:

1. A floor drain odor control device for removable insertion into the surface region of a floor drain, said device comprised of:
   a. a housing with openings therein and which covers the entire opening of the floor drain so that all gases and aqueous solutions passing through the floor drain also pass through the internal area of said housing; and
   b. a washable and regenerable carbon-based adsorbent located within said housing, said adsorbent having its odor-reducing capacity regenerated through washing by and contact with aqueous solutions passing through the floor drain.

2. The floor drain odor control device of claim 1, wherein said housing further comprises a flange extending from the outer perimeter of said housing which rests on the floor drain and is secured by and rests under the floor drain cover, said flange attached to the upper region of said housing so that said adsorbent within said housing is located below said flange.

3. The floor drain odor control device of claim 2, wherein the diameter of said flange can be adjusted to allow said device to adapt to floor drains having different diameters.

4. The floor drain odor control device of claim 1, wherein said housing is removably attached to and suspended from the underside of the floor drain cover.

5. The floor drain odor control device of claim 4, wherein said housing further comprises a nonpermeable flange extending from the outer perimeter of the housing and which acts to cover any opening, at the top of the floor drain, between the internal walls of the floor drain and said walls of said housing.

6. The floor drain odor control device of claim 1, wherein said housing is operable in floor drains having an upper surface region, under the floor drain cover, which is larger than the diameter of the floor drain, with said housing operable to rest in this upper surface region on top of the smaller diameter floor drain.

7. The floor drain odor control device of claim 1, wherein said adsorbent is selected from the group consisting of granular, pellet, cloth and bonded particle adsorbents in differing shapes and sizes.

8. The floor drain odor control device of claim 1, wherein said adsorbent is a catalytically-active carbonaceous char.

9. The floor drain odor control device of claim 8, wherein said catalytically-active carbonaceous char is produced by (a) carbonizing a bituminous coal or a coal having bituminous properties at temperatures below 700° C., in the presence of an oxidant gas; (b) oxidizing said bituminous coal or coal having bituminous properties at temperatures below 700° C. during or after said carbonization; and (c) contacting said carbonized and oxidized coal or coal containing bituminous properties with a nitrogen-containing compound and during said contacting increasing the temperature to above 700° C.

\* \* \* \* \*